J. F. Greene.
Flocking Mach.

N°. 570
31574.

Patented Feb 26. 1861.

Witnesses.

Inventor
John F. Greene

UNITED STATES PATENT OFFICE.

JOHN F. GREENE, OF BROOKLYN, NEW YORK, ASSIGNOR TO SAML. B. TOBEY, OF PROVIDENCE, RHODE ISLAND.

MACHINE FOR SIFTING FLOCK.

Specification of Letters Patent No. 31,574, dated February 26, 1861.

*To all whom it may concern:*

Be it known that I, J. F. GREENE, of Brooklyn, county of Kings, and State of New York, have invented certain new and useful Improvements in Machinery for Sifting Flocks or other Fibers Produced from the Disintegration of Felts or Cloths; and I do hereby declare that the following is a full, clear, and exact description thereof, reference being had to the accompanying drawings, making part of this specification, in which—

Figure 1:
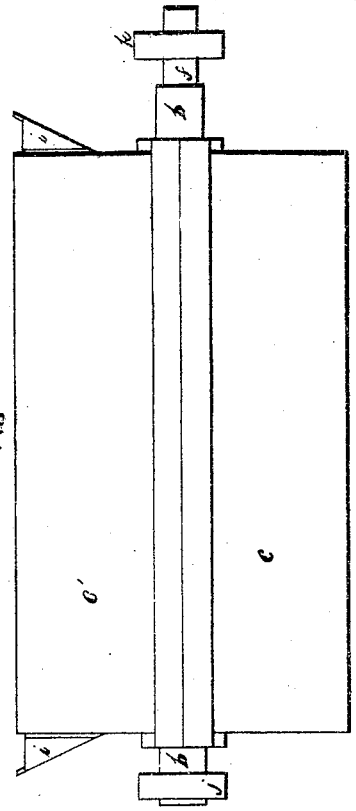
Figure 2:
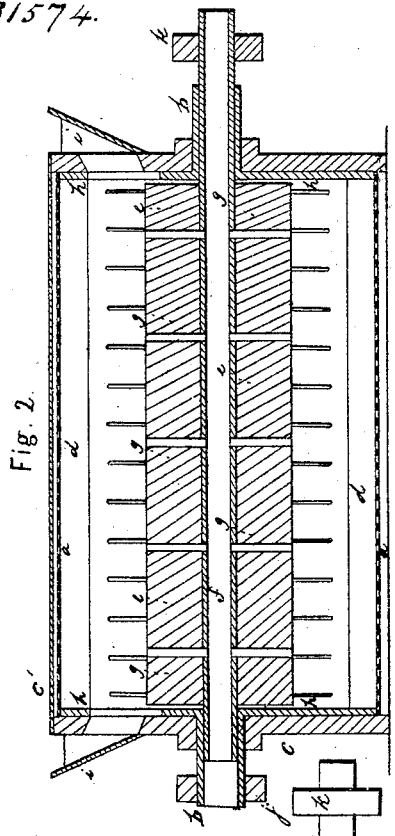
Figure 4:
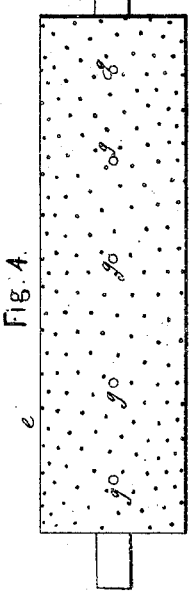
Figure 3:
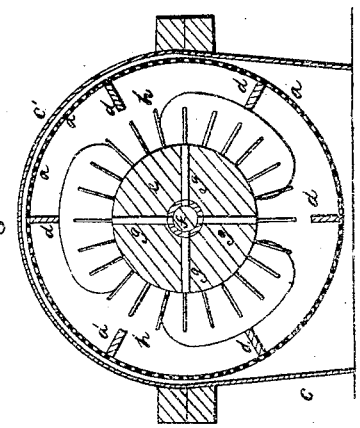

Figure 1, is a side view of the machine; Fig. 2, a longitudinal vertical section; Fig. 3, a cross vertical section; and Fig. 4, an elevation of the cylinder (*e*) without the teeth, their position only being indicated by dots.

The same letters indicate like parts in all the figures.

In many branches of manufactures, such as in making felts and napped india rubber fabrics, &c., flocks or shearings of woolen cloth and fibers obtained from the disintegration of refuse felts and woolen cloths, are now extensively used. But in the use of these serious difficulties have been experienced. The fibers so obtained are short and very irregular, and often mixed with impurities and to sift them so as to obtain together such as are of uniform size and to separate them from impurities has been the desideratum. The nature of the material and its great tendency to mat and felt together in lumps when subjected to friction, have presented serious difficulties. By my invention I have successfully accomplished the desired result, and my said invention consists in the employment of a slowly rotating cylindrical sieve with blades or ribs on its inner periphery, and with open heads or ends for feeding in the material, combined with a rapidly rotating concentric cylinder having projecting teeth and apertures or passages for air communicating with its shaft, which is hollow to produce outward blasts of air to act on the material to be sifted.

In the accompanying drawings (*a*) represents a cylindrical sieve of wire cloth, or equivalent therefor, mounted upon tubular journals (*b, b*) at each end fitted to turn in suitable boxes in a surrounding case (*c*). This sieve is provided inside with a series of blades or ribs (*d*) extending the whole length parallel with the axis, and placed at equal, or nearly equal, distances apart. Inside of this sieve there is a concentric solid cylinder (*e*) mounted on a tubular shaft (*f*) fitted to turn in the tubular journals of the sieve. Radial holes (*g*) pass from the tubular shaft to the periphery of this cylinder for the passage of currents of air. The periphery of this cylinder is armed with radial teeth which I prefer to make of wire driven into the wood of the cylinder and inserted in helical rows from each end toward the middle for a purpose to be presently described. The heads (*h, h*) of the cylindrical sieve are formed open with arms to form the connection with the hollow journals. The openings in the heads are for the introduction of the material to be sifted to the inside of the sieve from two hoppers (*i, i*) fitted to the outer case, one at each end. The case is made in two parts, the lower part (*c*) carrying the boxes for the hollow journals of the sieve, and the upper part (*c′*) which is fitted to the upper edge of the lower part, is semi-cylindrical, and is made just to clear the sieve: And the rim of the two heads are packed to run in contact with the ends of the case to prevent the escape of any of the material without being sifted.

The cylindrical sieve is rotated with a slow motion, about twenty revolutions per minute, by a belt from a driving pulley passing onto a pulley (*j*) on one of the hollow journals, and the cylinder (*e*) inside is rotated at a high velocity by another belt passing onto a pulley (*k*) on one end of the tubular shaft (*f*); about two thousand revolutions per minute is a good velocity for this shaft.

As the material is supplied to the hoppers it passes into the ends of the cylindrical sieve through the openings in the heads, and as it falls onto the bottom by the slow rotation it is carried up by the rib or ribs (*d*) and when carried falls back passing among the teeth of the inner cylinder which moving at a high velocity beat it and open it and by the joint action of centrifugal force and the currents of air force it outward against the inner surface of the sieve carrying such fibers through the meshes as are of the proper size so soon as they are properly liberated from the rest of the material. The currents of air referred to are induced by the rotation of the cylinder at a high velocity the radial apertures from the hollow shaft to the periphery acting as a blower; but if in some instances the force of the currents should not be sufficient the hollow shaft can be connected with a suitable blowing apparatus.

With a view to an equal distribution of the material along the length of the sieve, the teeth on the inner cylinder ($e$) are arranged in helical lines from each end of the cylinder toward the middle, and by their revolution they gradually carry the material from each end toward the middle, and thus effectually distribute it.

The top of the case can be readily lifted off to take out the cylinder when it is necessary to discharge the refuse matter. The lower part of the case which is open for the discharge of the sifted material may be connected in any desired manner with the surfaces to be coated with the sifted flocks or fibers.

What I claim as my invention and desire to secure by Letters Patent is—

The slowly rotating sieve cylinder with its open heads and inward projecting blades or ribs, and its outer casing, substantially as described, in combination with the rapidly rotating inner concentric cylinder having teeth and apertures for air communicating with the hollow shaft, substantially as and for the purpose specified.

JOHN F. GREENE.

Witnesses:
WM. H. BISHOP,
ANDREW DE LACY.